United States Patent
Katsnelson et al.

(10) Patent No.: US 12,502,528 B2
(45) Date of Patent: Dec. 23, 2025

(54) METHOD AND MULTICHANNEL DEVICE FOR NON-INVASIVE STIMULATION OF VAGUS NERVE

(71) Applicant: HEBY, LLC, Dover, DE (US)

(72) Inventors: Yakov Katsnelson, Edgewater, NJ (US); Vladimir Chuev, Moscow (RU); Hank Beckhoff, Doylestown, PA (US)

(73) Assignee: HEBY, LLC

( * ) Notice: Subject to any disclaimer, the term of this patent is extended or adjusted under 35 U.S.C. 154(b) by 401 days.

(21) Appl. No.: 18/096,030

(22) Filed: Jan. 12, 2023

(65) Prior Publication Data
US 2024/0238582 A1    Jul. 18, 2024

(51) Int. Cl.
 *A61N 1/04* (2006.01)
 *A61N 1/02* (2006.01)
 *A61N 1/36* (2006.01)

(52) U.S. Cl.
 CPC ........... *A61N 1/0456* (2013.01); *A61N 1/025* (2013.01); *A61N 1/0476* (2013.01); *A61N 1/36034* (2017.08); *A61N 1/36036* (2017.08)

(58) Field of Classification Search
None
See application file for complete search history.

(56) References Cited

U.S. PATENT DOCUMENTS

| | | | | |
|---|---|---|---|---|
| 2020/0001041 A1* | 1/2020 | Kranck | ................. | A61M 21/02 |
| 2022/0160995 A1* | 5/2022 | Wetmore | ............. | A61M 21/00 |
| 2022/0257149 A1* | 8/2022 | Ralston | ................. | G16H 50/50 |

* cited by examiner

*Primary Examiner* — Michael W Kahelin
(74) *Attorney, Agent, or Firm* — Gearhart Law, LLC

(57) ABSTRACT

Described herein are a method and a device for noninvasive stimulation of the Vagus nerve. The device is a multichannel device configured to provide non-invasive alternating stimulation of the left and right ear branches of the Vagus nerve as well as acupuncture points of the earlobes using various waveforms. Advantageously, the waveforms are designed to prevent acquired tolerance of the Vagus nerve stimulation thereby creating more effective treatments for a patient.

16 Claims, 6 Drawing Sheets

308

306

METHOD AND MULTICHANNEL DEVICE FOR NON-INVASIVE STIMULATION OF VAGUS NERVE

CROSS-REFERENCE TO RELATED APPLICATIONS

This application is a U.S. non-provisional application and therefore claims no priority to any patent or patent application.

FIELD OF THE EMBODIMENTS

The field of the present invention and its embodiments relate to a method and device for noninvasive stimulation of the Vagus nerve. In particular, the multichannel apparatus is configured to provide non-invasive alternating stimulation of the right ear (auricular) and right neck (cervical), and left ear (auricular) and left neck (cervical) branches of the Vagus nerve as well as acupuncture points of the earlobes.

BACKGROUND OF THE EMBODIMENTS

The Vagus nerve is the longest cranial nerve in the human body. It contains motor and sensory fibers and, because it passes through the neck and thorax to the abdomen, has the widest distribution in the body. Also, it contains somatic and visceral afferent fibers, as well as general and special visceral efferent fibers.

The Vagus interface enables the medulla oblongata with parasympathetic control of the heart, lungs, and digestive tract and is involved in the regulation of multiple systems.

The Vagus nerve includes: 1) a sensory "auricular" branch that innervates the external ear. The upper, smaller part of the external ear lying above the crus helicis of the external ear called the cymba conchae, it is innervated exclusively by this branch; other regions of the external ear receive afferent innervation by this branch solely, or shared with other nerves, e.g., the posterior and inferior walls of the ear canal and the cavity of the concha and 2) the cervical vagus nerve (CVN) is composed of both parasympathetic and sympathetic fibers supplying the heart, lungs and abdominal viscera. A major portion of the CVN is composed of afferent fibers, likely related to Vagus nerve stimulation (VNS) effects. The underlying mechanisms for the therapeutic effects are known to be closely related to the nucleus tractus solitarius, dorsal motor nucleus of vagus and their peripheral and supraspinal connections to various other cortical structures.

The earlobe is innervated by the greater auricular nerve, which is a composite nerve of cervical spinal nerves 2 and 3 and projects to the nucleus cuneatus in the brainstem.

Transcutaneous Vagus Nerve Stimulation (tVNS) is a non-invasive technique that involves the application of electrical currents through surface electrodes at select locations, most commonly targeting the auricular branch of the vagus nerve (ABVN) and the cervical branch of the vagus nerve in the neck. Although it has been shown that tVNS elicits hypo- and hyperactivation in various regions of the brain associated with anxiety and mood regulation, the mechanism of action and influence of stimulation parameters on clinical outcomes remains predominantly hypothetical. Suppositions are largely based on correlations between the neurobiology of the vagus nerve and its effects on neural activity.

However, tVNS has also been investigated for several other disorders, including tinnitus, migraine, and pain, by targeting the vagus nerve at sites in both the ear and the neck.

Noninvasive electrostimulation of the Vagus nerves is used to treat many different conditions including epilepsy, depression, anxiety, insomnia, drug and alcohol dependency, pain management, as well as to boost associative memory. Effects of known noninvasive electrostimulation techniques of the Vagus nerves are short lasting as repeated administration of electrical stimulation of the vagus nerve can lead to the development of the effect of acquired tolerance. Tolerance is the requirement of higher doses to produce a given response or the reduction in response after repeated administrations) or/and Tachyphylaxis.

An acquired tolerance can arise for the following reasons: 1. Dynamic tolerance: changes in the number or function of receptors due to the effects of electrical stimulation; 2. Physiological tolerance: homeostatic adaptation of unconnected systems to compensate for the effect of electrical stimulation; and 3. Behavioral tolerance: acquired compensation for the effect of electrical stimulation.

Until now, to achieve the given response preceding the development of tolerance, it was necessary to increase the dosage of medications or to increase the current amplitude. The present application aims to reduce or prevent the development of tolerance and tachyphylaxis, without the need to increase the amplitude of the current.

Examples of the Vagus nerve stimulation mechanisms are provided below.

For instance, U.S. Pat. No. 8,843,210 pertains to treating a variety of diseases and disorders that are primarily or at least partially driven by an imbalance in neurotransmitters in the brain, such as asthma, COPD, depression, anxiety, epilepsy, fibromyalgia, and the like.

U.S. Pat. No. 8,874,205 pertains to a non-invasive electrical stimulation device that shapes an elongated electric field of effect that can be oriented parallel to a long nerve, such as a Vagus nerve in a patient's neck, producing a desired physiological response in the patient.

U.S. Pat. No. 9,375,571 pertains to devices, systems, and methods that allow a patient to self-treat a medical condition, such as migraine headache, by electrical noninvasive stimulation of a Vagus nerve.

U.S. Patent Application Publication 2016/109851 pertains to transdermal electrical stimulation (TES) applicators that are wearable and configured to attach to a subject's pinna (ear) and adapted to apply TES to modulate the subject's cognitive and/or physiological state.

U.S. Patent Application 2018/050773 pertains to a wearable device to improve exercise capacity via electrical stimulation applied to the skin of the outer ear to produce autonomic modulation.

Various systems and methodologies are known in the art. However, their structure and means of operation are different from the present disclosure. The other inventions fail to solve all the problems taught by the present disclosure. At least one embodiment of this invention is presented in the drawings below and will be described in more detail herein.

BRIEF SUMMARY OF THE EMBODIMENTS

Noninvasive electrostimulation of the Vagus nerves is used to treat many different conditions including epilepsy, depression, anxiety, insomnia, drug and alcohol dependency, pain management, as well as to boost associative memory. However, the effects of noninvasive electrostimulation of the Vagus nerves are often unstable. Furthermore, electrostimulation therapies are subject to acquired tolerance from prolonged or repeated electrical stimulation. Prolonged electrostimulation is a primary cause of unstable effects associated with non-invasive electrostimulation of the Vagus nerves. The present invention and its embodiments relate to a multichannel apparatus to stimulate Vagus nerves. This is done in furtherance of preventing the development of tolerance and tachyphylaxis, without the need to increase the amplitude of the current of applied electronic pulses.

In one aspect of the present application, there is an apparatus configured to stimulate a Vagus nerve of a patient, the apparatus includes a first pair of electrodes having a first channel, the first pair of electrodes being configured to be coupled to an left ear of a patient and to left a neck of a patient and a second pair of electrodes having a second channel, the second pair of electrodes being configured to be coupled to an right ear of a patient and to right a neck of a patient a controller coupled to the first pair of electrodes and the second pair of electrodes, where the controller is configured to activate or deactivate the first pair of electrodes and the second pair of electrodes thereby causing at least one of the first pair of electrodes and the second pair of electrodes to emit one or more electronic pulses, where the first pair of electrodes and where the second pair of electrodes operate alternatingly.

The apparatus may also include where the one or more electronic pulses comprise a carrier wave having a frequency of about 75 kHz to 150 kHz.

The apparatus may also include where each of the one or more electronic pulses has a bipolar phase form.

In another aspect of the present application, there is an apparatus configured to stimulate a Vagus nerve of a patient, the apparatus includes a first pair of electrodes having a first channel, the first pair of electrodes being configured to be coupled to a left ear and left neck of a patient, a second pair of electrodes having a second channel, the second pair of electrodes being configured to be coupled to an right ear and a right neck of a patient, a controller coupled to the first pair of electrodes and the second pair of electrodes, where the controller is configured to activate or deactivate the first pair of electrodes and the second pair of electrodes thereby causing at least one of the first pair of electrodes and the second pair of electrodes to emit one or more electronic pulses, where the one or more electronic pulses includes a carrier wave having a first frequency, and where the carrier wave is modulated by a modulating frequency that randomly changes in frequency over a time period, where the first pair of electrodes operate, and where the second pair of electrodes operate alternatingly.

The apparatus may also include where the first channel is associated with a first electronic pulse protocol and the second channel is associated with a second electronic pulse protocol.

The apparatus may also include where a polarity of the one or more electronic pulses is inverted every 50 seconds.

The apparatus may also include where the modulating frequency is in a range of about 5.0 to 10.0 Hz.

The apparatus may also include where the one or more electronic pulses have a positive amplitude and a negative amplitude.

In yet another aspect of the present application, there is a method for stimulating a Vagus nerve of a patient, the method includes the steps of attaching, to the patient, a first pair of electrodes configured to operate on a first channel to an left ear and left neck of the patient, attaching, to the patient, a second pair of electrodes configured to operate on a second channel to an right ear and an right neck area of a patient, using a controller coupled to the first pair of electrodes and the second pair of electrodes, to activate or deactivate the first pair of electrodes and the second pair of electrodes thereby causing at least one of the first pair of electrodes and the second pair of electrodes to emit one or more electronic pulses, where the one or more electronic pulses includes a carrier wave having a first frequency, and where the carrier wave is modulated by a modulating frequency that randomly changes in frequency over a time period, where the first pair of electrodes operate and where the second pair of electrodes operate alternatingly.

The method may also include where the one of the first pair of electrodes are coupled to each earlobe of the patient.

The method may also include where the one or more electronic pulses sent on a first channel have a modulating frequency of about 8 to 10 Hz, and the modulating frequency randomly changes every 200 seconds.

The method may also include where the one or more electronic pulses sent on a second channel have a modulating frequency of about 5 to 7 Hz, and the modulating frequency randomly changes every 200 seconds.

The apparatus may also include where the carrier wave is modulated by one or more modulating frequencies.

The apparatus may also include where one or more modulating frequencies is in a range of about 5.5 to 6.5 kHz.

The apparatus may also include where the one or more modulating frequencies randomly changes every 200 seconds.

The apparatus may also include where a ratio of a positive amplitude of the bipolar phase form to a negative amplitude of the bipolar phase form is equal to 3.

The apparatus may also include where the first channel and the second channel are independent of one another.

The apparatus may also include where the positive amplitude is in a range of about 0.05 mA to about 2 mA.

The apparatus may also include where the negative amplitude is in a range of about 0.1 mA to about 0.7 mA. Other technical features may be readily apparent to one skilled in the art from the following figures, descriptions, and claims.

Other technical features may be readily apparent to one skilled in the art from the following figures, descriptions, and claims.

DETAILED DESCRIPTION OF THE EMBODIMENTS

Figure 1:
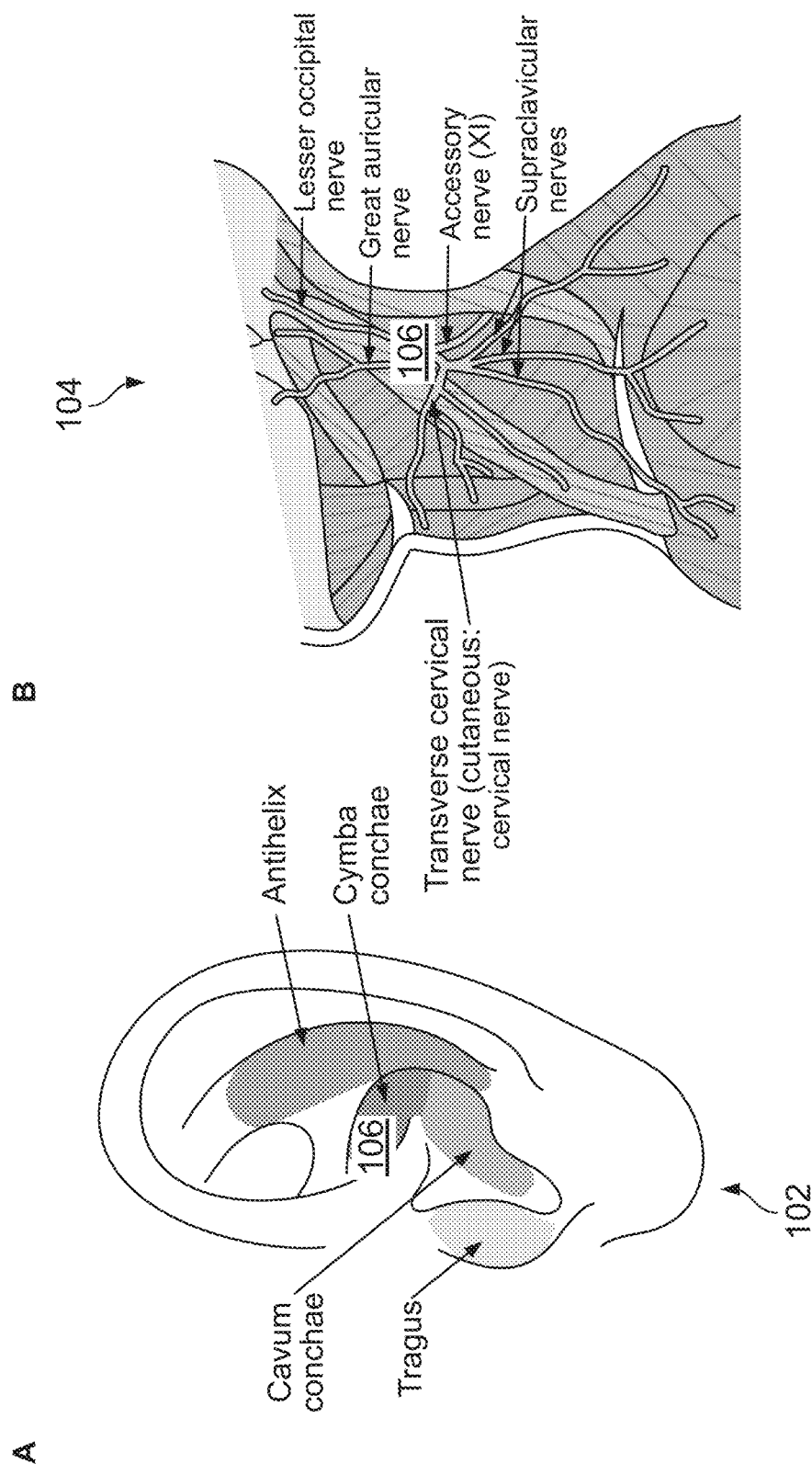
FIG. 1 illustrates an electrode placement consistent with an embodiment of the present invention with the electrodes being placed on an ear and a neck area of a patient.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, there is an exemplary diagram of an ear 102 and a neck 104 of a patient. Here, the ear 102 is indicated to have multiple areas or zones in which electrodes 106 may be placed. As shown in FIG. 1, it is preferred that the electrodes 106 to be coupled to the ear 102 of the patient are coupled to the cymba conchae of the ear 102. For the neck 104 of the patient, the electrodes 106 are to be coupled to the area of the neck 104 corresponding to the transverse cervical nerve or cutaneous cervical nerve. As will be described further herein, the electrodes 106 are to be in pairs of electrodes 106 which are coupled to the ears and neck of the patient. A first pair of electrodes 106 are preferably configured to be coupled to a right ear and a right neck of the patient. A second pair of electrodes 106 are preferably configured to be coupled to the left ear and left neck of the patient.

Figure 2:
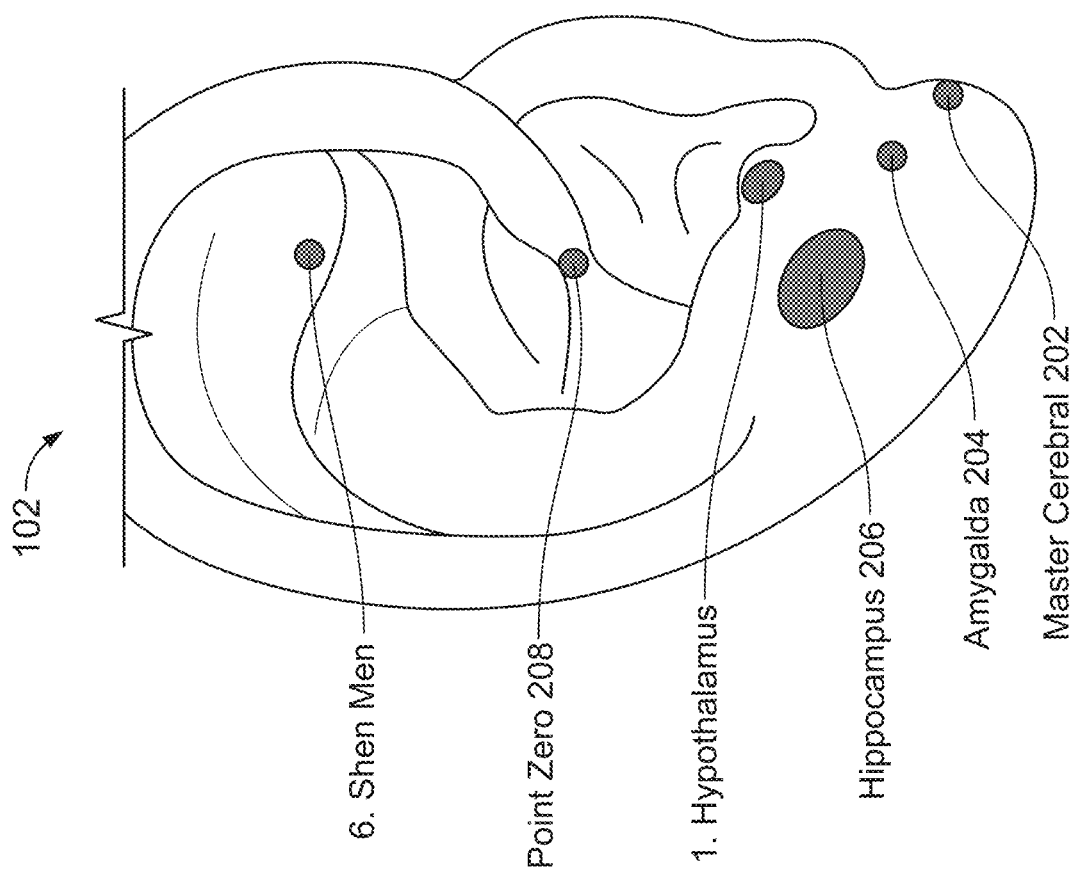
FIG. 2 illustrates various electrode placement positions on a patient's ear.

Turning now to FIG. 2 of the present application, there are alternative points of electrode 106 coupling for an ear 102 of a patient. At least the following points of the ear 102 may be activated through electrodes placed on the earlobes or through other placement on the ear 102: master cerebral 202 point which influences in psychemotional and psychosomatic disorders; amygdala 204 point which modulates the expression of irritability, anger, fear, and aggression; and hippocampus 206-point influences memory encoding and retention of emotional experiences. Further, point zero 208 and hypothalamus 1 may be activated during Vagus nerve stimulation which influences the mind, emotions, and body towards homeostasis balance thereby mitigating the negative effects of fatigue on cognition and mood, burnout syndromes. In turn, points 1, 202, 204 and 206, 208 are stimulated during stimulation of the electrodes located preferably on the earlobes of the patient.

Given the arrangement of the potential electrode positions described herein, FIGS. 3A-D demonstrate the waveform or electronic pulses to be delivered to the patient to achieve the desired result.

The desired waveform is to be delivered via a first set of electrodes and a second set of electrodes. The first set of electrodes comprises at least two electrodes with at least one of each of the at least two electrodes being coupled to an ear of the user. The second set of electrodes comprises at least two electrodes with at least one of each of the at least two electrodes being coupled to a neck of the user. The position of attachment of the electrodes may be as described in FIG. 1 herein.

Figure 3A:
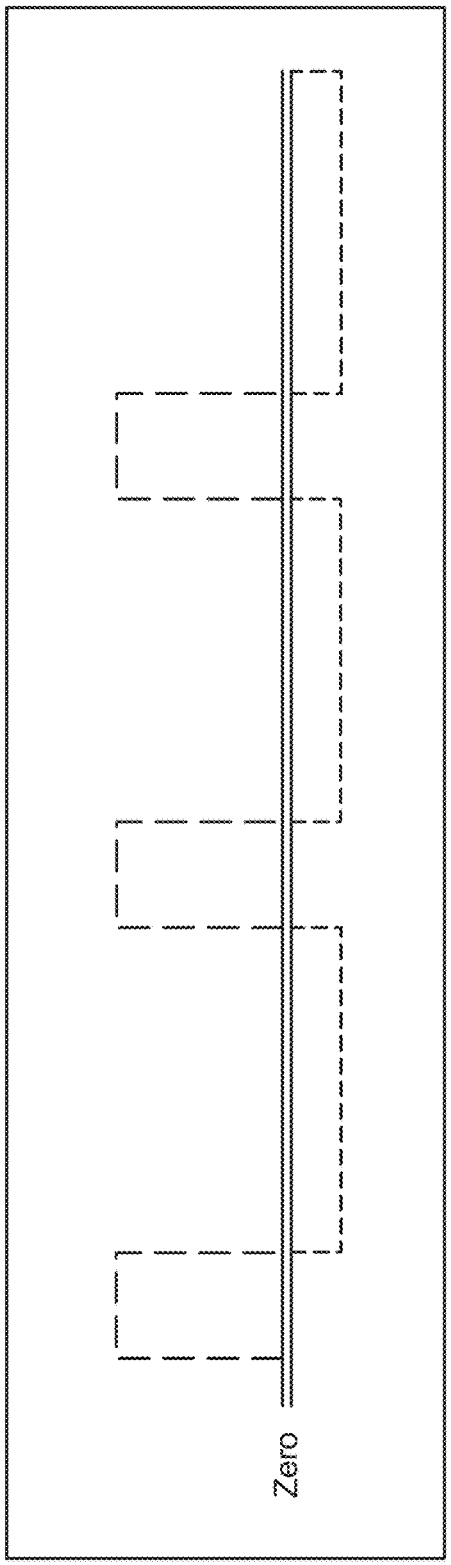
FIG. 3A illustrates a carrier waveform of an embodiment of the present invention.

The desired waveform is preferably delivered via a carrier wave 302 or frequency as shown in FIG. 3A. Parameters of the carrier wave 302 include a frequency in the range of about 50 kHz to 200 kHz and more preferably in the range of about 75 kHz to 150 kHz. During the delivery of said carrier wave 302, a random number generator will be utilized to change the frequency of the carrier wave 302 every 200 seconds. Further, the duty cycle of the carrier wave 302 will preferably remain constant with a flip (inverse) in polarity of the carrier wave 302 every 50 seconds. The carrier wave 302 is desired to be modified by two different methodologies. One for the first set of electrodes, and another for the second set of electrodes.

For the first modification to the carrier wave 302, there may be two independent channels to stimulate the left auricular and left cervical branches of the Vagus nerve and right auricular and right cervical branches of the Vagus nerve. It should firstly be noted that stimulation of the left auricular and left cervical branches of the Vagus nerve and right auricular and right cervical branches of the Vagus nerve should be conducted alternately, about every two minutes. The use of two independent channels with the same electronic pulse parameters, but not operating simultaneously, is critical not only to prevent the development of tolerance and tachyphylaxis, but also to prevent the development of an interference effect in the brain structures that would change the proposed modulation frequency.

Figure 3B:
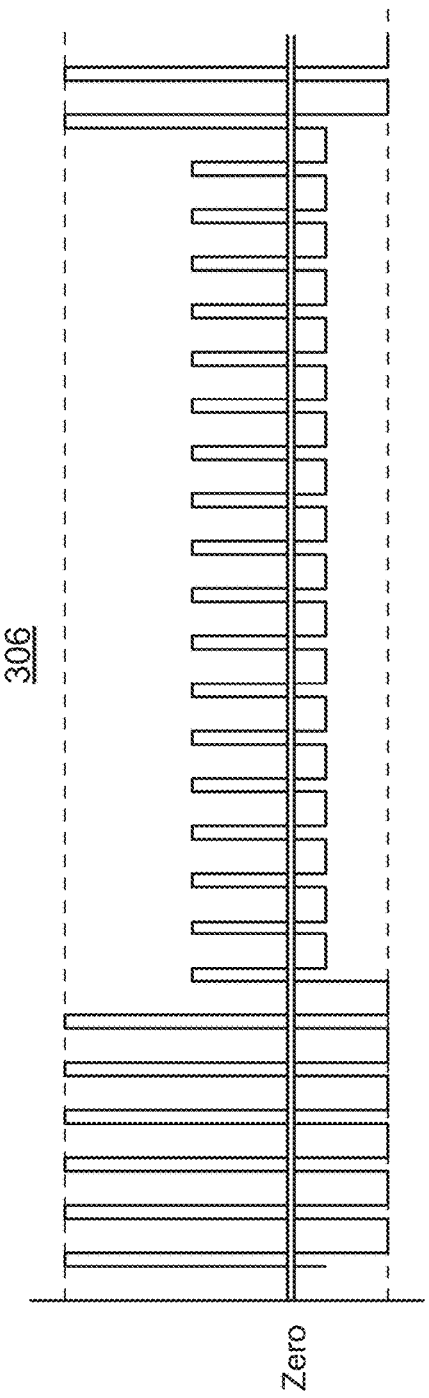
FIG. 3B illustrates a positively modulated waveform of an embodiment of the present invention.
Figure 3C:
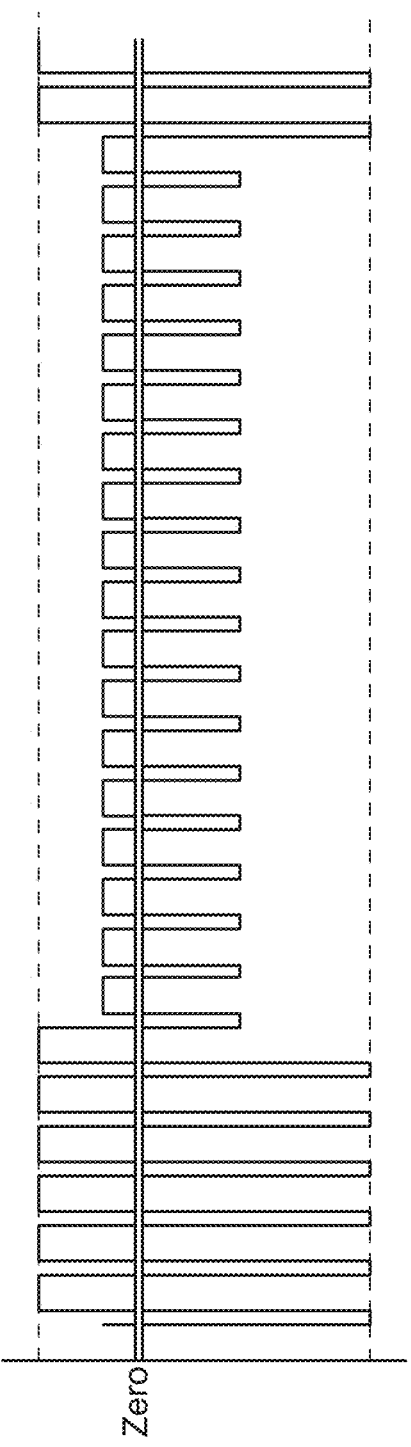
FIG. 3C illustrates a negatively modulated waveform of an embodiment of the present invention.
Figure 3D:
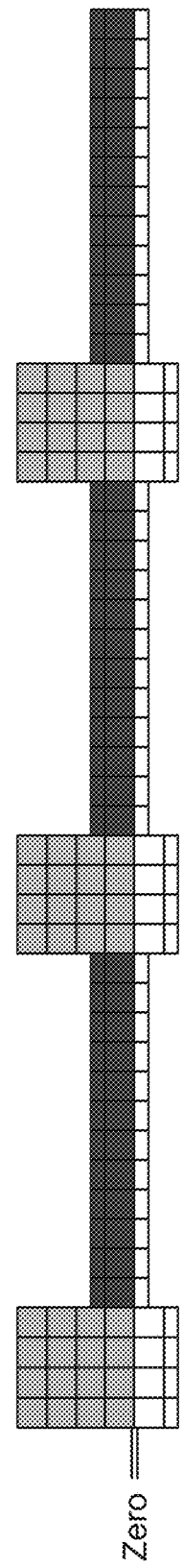
FIG. 3D illustrates a separate positively modulated waveform of an embodiment of the present invention.

In order to modify or modulate the carrier wave 302, there is a modulated waveform 306 as shown in FIG. 3B. A modulating frequency may be in a range of about 3 kHz to 9 kHz and more preferably in a range of about 5.5 kHz to 6.5 kHz. This modulating frequency modulates the carrier wave 302 (as shown in FIG. 3A) to create the modulated waveform 306. An alternative view of the waveform more clearly showing the ration of positive to negative amplitude of the waveform is shown in FIG. 3D. Every 200 seconds, the modulated waveform 306, as shown in FIG. 3B in the proposed range will change randomly using a random number generator. Throughout the modulation of the carrier wave 302, the duty cycle is intended to remain constant and equal to 4, regardless of the randomly selected modulation frequency and polarity reversal (every 50 seconds). In the event of a polarity reversal the modulated waveform will be a negative waveform 308 as shown in FIG. 3C.

As noted, the desired modulated waveform is to be bipolar (negative and positive). A ratio of the amplitude of the positive and negative parts of the bipolar pulse and the amplitude of the current, depending on the polarity, should be equal to 3 or ⅓ with a modulation depth of about 75%.

Further, a range of amplitude of the positive phase may be about 1.5 mA to about 2 mA, and the negative phase may be about 0.5 mA to about 0.666 mA. However, when the polarity is reversed, positive phase may be in a range of about 0.5 mA to about 0.666 mA, and the negative phase may be in a range of about 1.5 mA to about 2 mA. As previously noted, the polarity changes every 50 seconds throughout application of the electronic pulses.

Secondly, a second modification of the carrier wave 302 may be conducted on the ear channels. That is, the electrodes are coupled to the ear or earlobes of the patient. As with the previous modulation methodology, there is a modulated waveform 306. Here, the modulated waveform 306 is preferably in a range of about 6 Hz to 12 Hz and is more preferably in a range of about 8.1 to about 9.6 Hz. The modulated pulse is desired to be both rectangular and bipolar in waveform. Every 200 seconds during usage of the modulated waveform 306, the modulated waveform 306 will be randomly modified using the random number generator as previously described herein. Further, the duty cycle should remain constant and equal to 4, regardless of the randomly selected modulation frequency and polarity reversal.

Regarding polarity for this particular set of electrodes, the ratio of the amplitude of the positive and negative parts of the bipolar pulse and the amplitude of the current, depending on the polarity, should be equal to 3 or ⅓. The modulation depth should be about 75%. A range of amplitude of current for a positive phase is preferably about 0.2 mA to about 0.4 mA and about 0.067 to about 0.133 mA for the negative phase. When a change of polarity occurs, the positive phase may be in a range of about 0.067 to about 0.133 mA and the negative phase in a range of about 0.2 mA to about 0.4 mA. As with that described previously, the polarity here will change every 50 seconds.

Example

A study was conducted that included 18 patients comprising both men and women. Each patient was assigned to one of two groups thereby forming two groups of nine patients each. The first group or Group I received a control treatment whereas the second group or Group II received treatment with the device disclosed within the present application. The hospital anxiety and depression scale (HADS) were used for assessment which was done before treatment and after the fifth treatment.

In Table 1 below, shown are the control group on the left column and the experimental group in the right column related to the treatment of depression. The patients (by number) are listed on the left and their HADS scores are noted at the indicated intervals.

TABLE 1

| | Stimulation of right branch of auricular nerve | | Alternate stimulation of right and left branches of auricular nerve | |
| --- | --- | --- | --- | --- |
| | Before 1$^{st}$ stimulation | After 5$^{th}$ | Before 1$^{st}$ stimulation | After 5$^{th}$ |
| 1 | 8 | 7 | 8 | 6 |
| 2 | 7 | 6 | 9 | 6 |
| 3 | 12 | 10 | 9 | 7 |
| 4 | 11 | 9 | 7 | 4 |
| 5 | 8 | 8 | 10 | 6 |
| 6 | 9 | 7 | 9 | 7 |
| 7 | 9 | 7 | 9 | 5 |
| 8 | 7 | 7 | 7 | 4 |
| 9 | 10 | 7 | 11 | 6 |
| Pool Data | 9 | 7.6 | 8.8 | 5.7 |

Statistical analysis was performed of the effectiveness of non-invasive stimulation of the right branch (auricular nerve and cervical nerve)) of the Vagus nerve and alternate the right and left branches (auricular nerves and cervical nerves)) of the Vagus nerve based on a change in the severity of the symptom of depression. For statistical analysis, the ANOVA test was used, which is a widely used parametric test that is used to determine whether three or more groups have the same means. In each instance, the results were considered to be statistically significant having a P score of P<0.05. There were statistically significant differences (P<0.05) between the severity of depression after five (5) stimulations of the right auricular and right cervical, and left auricular and left cervical nerve branches of Vagus compared to the right branch of Vagus alone. Separately, a similar experiment was conducted as it related to anxiety rather than depression as shown in Table 2 below.

TABLE 2

| | Stimulation of right branches of auricular and cervical nerves | | Alternate stimulation of right and left branches of auricular and cervical nerves | |
| --- | --- | --- | --- | --- |
| | Before 1$^{st}$ stimulation | After 5$^{th}$ | Before 1$^{st}$ stimulation | After 5$^{th}$ |
| 1 | 9 | 7 | 8 | 4 |
| 2 | 11 | 9 | 8 | 4 |
| 3 | 7 | 7 | 11 | 8 |
| 4 | 6 | 6 | 10 | 5 |
| 5 | 10 | 7 | 8 | 4 |
| 6 | 8 | 5 | 6 | 4 |
| 7 | 8 | 5 | 7 | 4 |
| 8 | 7 | 7 | 6 | 6 |
| 9 | 12 | 8 | 9 | 6 |
| Pool Data | 8.7 | 6.8 | 8.1 | 5 |

Yet again, statistical analysis was performed of the effectiveness of non-invasive stimulation of the right branch (auricular nerve) of the Vagus nerve and alternate the right and left branches (auricular nerves) of the Vagus nerve based on a change in the severity of the symptom of anxiety. For statistical analysis, the ANOVA test was used, which is a widely used parametric test that is used to determine whether three or more groups have the same means. In each instance, the results were considered to be statistically significant having a P score of P<0.05. There were statistically significant differences (P<0.05) between the severity of anxiety after five (5) stimulations of the right and left auricular and cervical branches of Vagus compared to the right branch of Vagus alone.

From the above, it was concluded that the use of non-invasive Vagus nerve stimulation, based on alternate stimulation of the right ear and right neck and left ear and left neck brunches of the Vagus nerve, and the device implementing it, causes a statistically significant reduction in the severity of symptoms of depression and anxiety not only compared with their initial level but also compared to statistically significant reduction achieved by stimulation of only the right branch of the Vagus nerve. Achieving such results without increasing the amplitude of the current or exposure time is believed to be due to the following reasons: lack of development of the effect of acquired tolerance and tachyphylaxis, the development of which causes a decrease in the effectiveness of noninvasive vagus nerve stimulation.

Figure 4A:
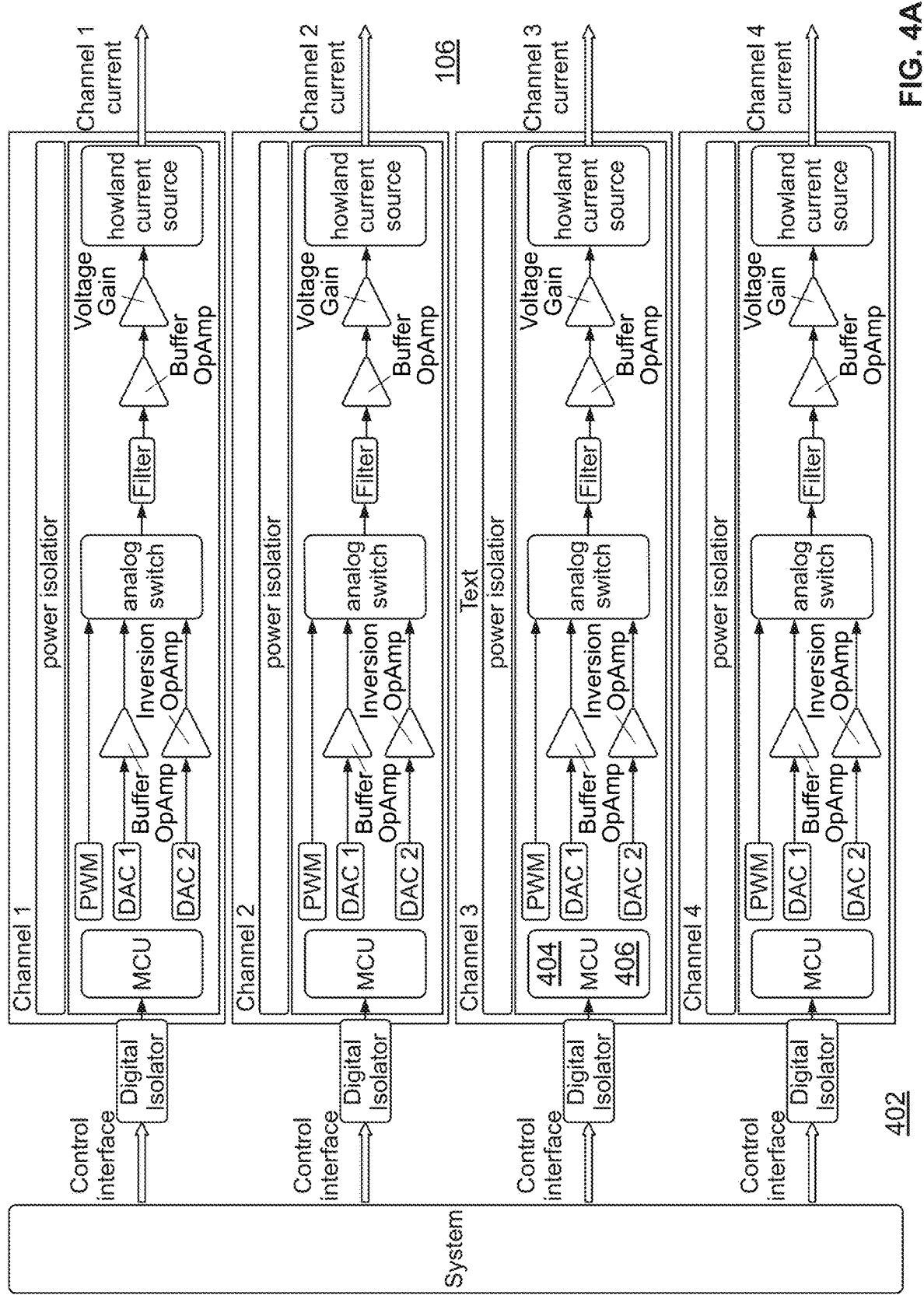
FIG. 4A illustrates a controller and controller interface of an embodiment of the present invention.

Turning now to FIG. 4A, shows a component view of the multichannel apparatus 402. The multichannel apparatus 402 may include a controller 404 and the pairs of electrodes 106. The controller 404 may activate or deactivate the pairs of electrodes 106 to provide an electrostimulation therapy of the Vagus nerves. The controller 404 may manage a number of parameters associated with the electrostimulation therapy such as a carrier wave frequency of the pulses, a modulating frequency of the pulses, a duration of a positive polarity pulse compared to a duration of a negative polarity pulse, a depth of a modulation of the pulses, an amplitude of a current of the positive polarity pulse, an amplitude of a current of the negative polarity pulse, a duration of the modulation of the pulse, and/or a time of treatment, among others.

A computing device 406 may be connected with the controller 404 and allow a user to adjust some or all of the parameters associated with the treatment. The computing device 406 may provide a user interface with which the user may interact to configure the controller 404. An example of the computing device 406 may include a mobile device such as a smartwatch, a smartphone, a tablet, and/or a laptop computer, among others. The computing device 406 may also include a desktop computer, a server, and/or a distributed computing system. The server and/or distributed computing system may provide the user interface (such as a website) through which the user may interact with the controller 404.

In a preferred embodiment, the multichannel apparatus 402 utilizes four (4) independent DC isolated channels, with each channel being a Howland current source controlled by a controller 404 being a microcontroller (MCU). Each of the aforementioned channels are preferably controlled over an isolated interface using the system MCU. The MCU of a digital to analog converter (DAC) generates a positive and negative voltage (negative voltage is formed using an inverter on OpAmp), which is modulated by the carrier frequency, as described in FIGS. 3A-D, using pulse width modulation (PWM). The signal size of the DAC channels is regulated by the MCU, thereby creating the modulation. The voltage is amplified by OpAmp to provide the required current value in the Howland current source. Both DAC channels (positive and negative) together with the PWM are preferably connected to an analog switch that switches the DAC 1 and DAC 2 signals with the carrier frequency. Since the analog switch has noise emissions during switching, the circuit has a buffer OpAmp as well as LPF before and after it.

Figure 4B:
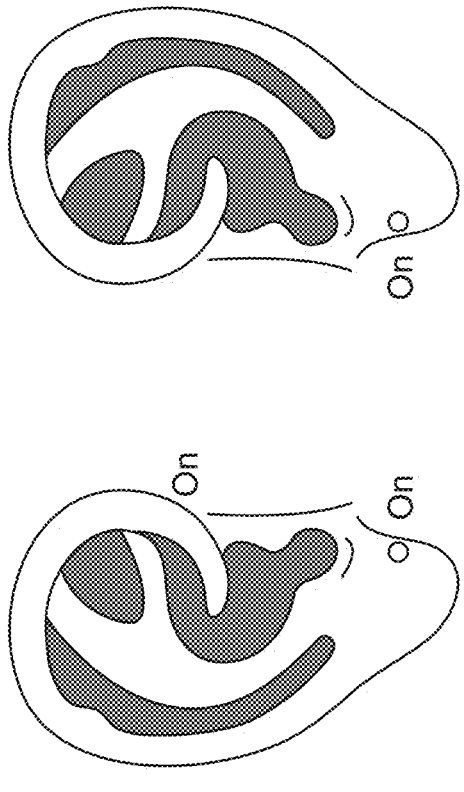
FIG. 4B illustrates an aspect of the subject matter in accordance with one embodiment.

FIG. 4B also shows an interface 408 to manage the multichannel apparatus 402. The interface 408 may be provided through the computing device 406 to allow a user to interact with the controller 404. The user may be allowed to interact with the controller 404, monitor a session of an electrostimulation therapy, and adjust parameters of the session.

In an example scenario, the interface 408 may display a state associated with the electrostimulation therapy. The state may notify the user regarding a treatment in progress, a start of the treatment, and/or a stopped/ended treatment. A control box, within the interface 408, may allow the user to start, pause, continue, and/or cancel a treatment session. An electrodes state box may display the location of the pairs of the electrodes 106 in relation to the structures of the right and/or left ears and left and/or right neck areas. The electrodes state box may also provide active and/or de-active notification associated with each of the attached pair of electrodes. Furthermore, the interface may include a session box that display information associated with the session. For example, a remaining time associated with the session may be provided. In addition, a number of remaining sessions may also be displayed.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An apparatus configured to stimulate a Vagus nerve of a patient, the apparatus comprising:
a first pair of electrodes having a first channel, the first pair of electrodes being configured to be coupled to a left ear and left neck of a patient;
a second pair of electrodes having a second channel, the second pair of electrodes being configured to be coupled to a right ear and right neck of a patient;
a controller coupled to the first pair of electrodes and the second pair of electrodes, wherein the controller is configured to activate or deactivate the first pair of electrodes and the second pair of electrodes thereby causing at least one of the first pair of electrodes and the second pair of electrodes to emit one or more electronic pulses;
wherein the one or more electronic pulses comprise a carrier wave having a frequency of about 75 kHz to about 150 kHz,
wherein the first pair of electrodes operate alternatingly with respect to each of the first pair of electrodes, and
wherein the second pair of electrodes operate alternatingly with respect to each of the second pair of electrodes.

2. The apparatus of claim 1 wherein each of the one or more electronic pulses have a bipolar phase form.

3. The apparatus of claim 1 wherein the carrier wave is modulated by one or more modulating frequencies.

4. The apparatus of claim 3 wherein one or more modulating frequencies is in a range of about 5.5 to about 6.5 kHz.

5. The apparatus of claim 3 wherein the one or more modulating frequencies randomly changes every 200 seconds.

6. The apparatus of claim 2 wherein the ratio of a positive amplitude of the bipolar phase form to a negative amplitude of the bipolar phase form is equal to 3.

7. An apparatus configured to stimulate a Vagus nerve of a patient, the apparatus comprising:
a first pair of electrodes having a first channel, the first pair of electrodes being configured to be coupled to a left ear and left neck of a patient;
a second pair of electrodes having a second channel, the second pair of electrodes being configured to be coupled to right ear and right a neck of a patient;
a controller coupled to the first pair of electrodes and the second pair of electrodes, wherein the controller is configured to activate or deactivate the first pair of electrodes and the second pair of electrodes thereby causing at least one of the first pair of electrodes and the second pair of electrodes to emit one or more electronic pulses,
wherein a polarity of the one or more electronic pulses is inverted every 50 seconds,
wherein the one or more electronic pulses comprises a carrier wave having a first frequency,
wherein the carrier wave is modulated by a modulating frequency that randomly changes in frequency over a time period,
wherein the first pair of electrodes operate alternatingly with respect to each of the first pair of electrodes, and
wherein the second pair of electrodes operate alternatingly with respect to each of the second pair of electrodes.

8. The apparatus of claim 7 wherein the first channel is associated with a first electronic pulse protocol and the second channel is associated with a second electronic pulse protocol.

9. The apparatus of claim 8 wherein the first channel and the second channel each have a frequency that is independent from one another.

10. The apparatus of claim 7 wherein the first frequency is about 75 kHz to about 150 kHz.

11. The apparatus of claim 7 wherein the modulating frequency is in a range of about 5.0 to about 10.0 Hz.

12. The apparatus of claim 7 wherein the one or more electronic pulses has a positive amplitude and a negative amplitude.

13. The apparatus of claim 12 wherein the positive amplitude is in a range of about 0.05 mA to about 2 mA.

14. The apparatus of claim 12 wherein the negative amplitude is in a range of about 0.1 mA to about 0.7 mA.

15. A method for stimulating a Vagus nerve of a patient, the method comprising the steps of:
- attaching, to the patient, a first pair of electrodes configured to operate on a first channel to an left ear and a left neck of the patient;
- attaching, to the patient, a second pair of electrodes configured to operate on a second channel to a right ear and a right neck area of a patient;
- using a controller coupled to the first pair of electrodes and the second pair of electrodes, to activate or deactivate the first pair of electrodes and the second pair of electrodes thereby causing at least one of the first pair of electrodes and the second pair of electrodes to emit one or more electronic pulses,
  - wherein the one or more electronic pulses comprises a carrier wave having a first frequency, and
  - wherein the carrier wave is modulated by a modulating frequency that randomly changes in frequency over a time period;
- wherein the one or more electronic pulses sent on a first channel have a modulating frequency of about 8 to 10 Hz, and the modulating frequency randomly changes every 200 seconds,
- wherein the first pair of electrodes operate alternatingly with respect to each of the first pair of electrodes, and
- wherein the second pair of electrodes operate alternatingly with respect to each of the second pair of electrodes.

16. The method of claim 15 wherein the one or more electronic pulses sent on a second channel have a modulating frequency of about 5 to about 7 Hz, and the modulating frequency randomly changes every 200 seconds.

* * * * *